United States Patent [19]
Schwering et al.

[11] Patent Number: 5,372,722
[45] Date of Patent: Dec. 13, 1994

[54] OIL SEPARATOR WITH INTEGRATED MICROFILTRATION DEVICE

[75] Inventors: Hans-Ulrich Schwering, Leonberg-Ramtel; Uwe Prinz, Fellbach, both of Germany

[73] Assignee: Gütling GmbH, Fellbach, Germany

[21] Appl. No.: 36,332

[22] Filed: Mar. 24, 1993

[30] Foreign Application Priority Data

Mar. 25, 1992 [DE] Germany ............... 4209588

[51] Int. Cl.$^5$ ............................. B01D 65/02
[52] U.S. Cl. .................. 210/636; 210/134; 210/195.2; 210/320; 210/321.87; 210/521
[58] Field of Search ............. 210/97, 108, 109, 110, 210/134, 136, 139, 321.69, 321.79, 321.80, 321.88, 321.89, 188, 194, 195.2, 195.3, 195.4, 257.2, 299, 302, 320, 323.2, 416.1, 500.23, 510.1, 521, 523, 636, 791, 798, 86, 259, 321.87, 456, 800, 121–123, 410–412, 418–426

[56] References Cited

U.S. PATENT DOCUMENTS

| | | | |
|---|---|---|---|
| 4,194,976 | 3/1980 | Robinsky | 210/521 |
| 4,859,324 | 8/1989 | Levy et al. | 210/321.87 |
| 4,921,610 | 5/1990 | Ford et al. | 210/636 |
| 4,980,066 | 12/1990 | Slegers | 210/636 |
| 5,192,456 | 3/1993 | Ishida et al. | 210/323.2 |

FOREIGN PATENT DOCUMENTS 1250374 2/1958 Germany ................. 210/299
8515036 7/1985 Germany ................. 210/299

OTHER PUBLICATIONS

Abtrennung von Feststoffen aus dem Abwasser, 60. Siedlungswasserwirtschaftliches Kolloquium, Forschungs- und Entwicklungsinstitut für Industrie- und Siedlungswasserwirtschaft sowie Abfallwirtschaft e.V. Stuttgart, R. Oldenburg Verlag, München 1985 S. 294–304.

"Ultrafiltration, Microfiltration", Gütling GmbH, Fellbach, Germany, Nov. 1991.

Primary Examiner—Joseph W. Drodge
Attorney, Agent, or Firm—Flynn, Thiel, Boutell & Tanis

[57] ABSTRACT

A device is provided for separating oil and fat from a liquid mixture. The device includes a tank divided by a baffle plate into two separate compartments which leaves an opening between the compartments, a baffle disposed at the bottom of the tank for preventing migration of settled solids between compartments and an immersion type recirculation pump that sucks liquid out of one compartment and forces through a filtration device projecting into the tank that contains tubular ceramic membranes.

20 Claims, 2 Drawing Sheets

OIL SEPARATOR WITH INTEGRATED MICROFILTRATION DEVICE

BACKGROUND OF THE INVENTION

This invention refers to an oil separating device manufactured from a corrosion-resistant and temperature-resistant material, which is used to separate oil and fat, respectively, from a liquid mixture, having a pre-separation chamber in which terminates an inlet for the oily liquid mixture to be separated and in which floating oil and fat, respectively, is separated from the feed liquid mixture, a microfiltration stage which separates emulsified oil and fat droplets, respectively, from the liquid mixture with the aid of a filter membrane that has a pore size of 0.1–2 $\mu$m, preferably approximately 0.8 $\mu$m, and a permeate discharge to carry away the liquid mixture, which has been purified from the oil and grease, respectively, out of the oil separating device.

Such a device, is for instance, known from the data sheet "Ultrafiltration and Microfiltration" of the Gütling company published in November 1991. The ultrafiltration and microfiltration methodology is also known from the German publication "Abtrennung von Feststoffen aus dem Abwasser [Separation of Solids from Effluent] 60. Siedlungswasserwirtschaftliches Kolloquium, Forschungs- und Entwicklungsinstitut für Industrieund Siedlungswirtschaft sowie Abfallwirtschaft e.V. Stuttgart", R. Oldenburg Verlag, München 1985, pages 294–304.

The known device serves to separate oils, fats and solids from emulsions, especially oil/water mixtures. Such oily liquid mixtures are widely used as cooling lubricants in the metal fabricating industry. After mechanical shaping and finishing, it is necessary to clean the fabricated components. In the past, this was usually carried out in cleaning equipment which utilized chlorinated solvents as the cleaning medium. Due to environmental concerns, these chlorinated hydrocarbon based cleaners are increasingly being replaced by aqueous alkali cleaners. However, these cleaners have only a limited absorption capacity for oil, it is necessary to dump and treat them before disposal. If, however, such a cleaning solution is pumped continuously at a relatively high velocity and at a controlled pressure across a porous membrane, it is possible, if the pore size is suitable, to retain the oil while the cleaning solution is being recycled into the process. Ultrafiltration employs pore sizes of 0.03–0.05 $\mu$m, which also retains many of the surfactants. This effect is desirable where regulatory discharge standards have to be met, but it interferes with the recycling process. If, however, a relatively open microfiltration membrane with a pore size of between 0.1 and 2 $\mu$m is selected, then the surfactants can pass completely, which is beneficial for recycling purposes, even if accompanied by a certain amount of oil slippage. In this way, it is theoretically possible to achieve an "infinite" service life of the cleaning bath when using microfiltration in conjunction with replenishment of the bath constituents. In practice, a factor of $\times 5$ to $\times 10$ in the service life can be achieved, which is a significant contribution to attaining an environmentally friendly cleaning process.

In order to reduce the loading of the microfiltration stage, the known oil separating device is provided with a pre-separation stage ahead of the microfiltration stage in which the feed liquid mixture is retained for a relatively long time (circa ¼ to ½ hour), so that the non-emulsified oil can float to the top, and it can then be removed. For this reason only the emulsified oil has to be separated from the liquid mixture in the microfiltration state.

Since the liquid mixtures which are to be treated are normally either acidic or strongly alkaline and almost always very corrosive, the traditional oil separating devices are usually made out of plastic. This has, however, the disadvantage that hot liquid mixtures with temperatures above 60° C., as they often occur in industrial applications, must then be cooled down before entering the oil separating device. A further disadvantage with the traditional devices is that they require a relatively large space for the pre-separation stage and the subsequent microfiltration stage. The traditional oil separating devices are therefore mainly suited for treating large volumes of liquids by way of a central treatment operation, which, however, makes them unsuitable for increasing the service life of smaller liquid volumes because of the larger space requirement, and they are therefore uneconomical and too expensive.

In addition, there is a relatively large maintenance requirement, due to the regular cleaning and replacement of the polymeric membranes that are normally used in the microfiltration stage, where the oil clings to the surfaces from where it must typically be removed every 100 operating hours.

Another maintenance expense with the traditional oil separating devices is the need for the relatively frequent replacement of the floating ring seals in the externally located pumps which are normally used to transport the liquid to be cleaned and to generate the pressure for introducing the liquid mixture into the microfiltration stage. The surfactants which are normally added to the cleaning solutions often crystallize on the seals causing grooves in the gasket rings during operation of the pump and subsequent leakage of the latter. The otherwise conceivable reason to use magnetically coupled pumps instead of pumps with floating ring seals also does not offer an answer to the problem, since the magnetic swarf which is typically present in the liquids to be treated can lead to damage of the pump heads.

SUMMARY OF THE INVENTION

The object of the invention at hand is therefore to present an oil separating device of the type previously mentioned, which is heat resistant, compact and easy to maintain, and which can be used as a mobile plant for a wide range of applications to extend the service life of cleaning or degreasing solutions and which is suited also for use with smaller liquid mixture volumes and for in-situ applications, such as e.g.; on assembly lines.

According to the invention, this object is achieved in that the oil separating device is manufactured from stainless steel and comprises only one tank divided by a baffle plate which projects from the top towards the bottom leaving an opening towards the pre-separation chamber where, apart from the floating oil and fat, respectively, sinking solids contained in the feed liquid mixture are separated because of their specific gravity, and whereas a baffle is provided at the tank bottom below the baffle plate, and/or at a distance from the baffle plate in the compartment of the tank which is separated from the pre-separation chamber, which largely prevents the migration of the settled solids into the separate compartment and wherein the separate compartment is developed as a microfiltration stage inside of which an immersion type recirculation pump is fitted which sucks the liquid out of this separate compartment and forces it through a cross-flow filtration device which contains tubular ceramic membranes and which projects into the tank, and from which on the one side purified permeate is fed into the permeate discharge, and from which on the other side, the retentate which has not passed through the pores of the tubular ceramic membranes and which is saturated with oil and fat, respectively, is returned into the separate compartment.

Owing to its integral construction, the device, according to this invention, is particularly space-saving, so that it can also be used in smaller manufacturing facilities for extending the service life of cleaning or degreasing baths, as demanded by the environmental disposal regulations. Because of the compact design which results in only one single tank, just a small amount of raw material is needed in manufacturing the device according to this invention. By using stainless steel, the oil separating device according to this invention can also be employed for degreasing relatively hot liquid mixtures, and where additional costly cooling equipment which would need additional space on the one hand, and make the equipment significantly less economical due to the additional capital and operating costs, on the other, is not required. By fitting a user-friendly and seal-less immersion recirculation pump, the frequent replacement of rapidly worn floating ring seals which occur due to crystallization of the lye is no longer necessary. In addition, by using ceramic tubular membranes in the microfiltration stage which is integrated into the oil separating device according to this invention, the maintenance normally needed when traditional polymeric membranes are used is reduced to a minimum, as is explained later on. By providing a baffle which prevents the migration of settled solids from the pre-separation chamber into the separate compartment forming the microfiltration stage, larger particles are prevented from getting into the immersion recirculation pump and the cross-flow filtration device, which could otherwise have resulted in operational disturbances of the system, or at least required the frequent cleaning of the microfiltration stage and the pump. This results in additional lowering of equipment maintenance and a corresponding increase in trouble-free operation of the oil separating device according to this invention.

One of the embodiments has a baffle with a ramp rising steadily from the bottom of the pre-separation chamber through the gap below the baffle plate towards the separate compartment. This causes the precipitated heavier particles, which have entered the separate microfiltration compartment through the gap, to roll or slide back into the pre-separation chamber.

Separators comprising one single tank with two chambers and baffles formed by the side walls are actually known from the DE-GM 85 15 036. A baffle with a ramp can be gathered from DE-AS 12 50 374. These known devices show, if at all, only an externally positioned ultrafiltration unit. In contrast thereto, the compact design according to the invention is new and results in a number of sometimes surprising advantages such as mobility, small space requirement, simplicity and better efficacy.

In another embodiment, the baffle in the separate compartment may have a wall extending from the tank bottom towards the top up to at least the level of the lower edge of the baffle plate, preferably a little beyond.

In this fashion, the gap between the two compartments of the tank becomes optically closed, and heavy solids can enter into the separate compartment from the pre-separation chamber only under exceptional circumstances and with very strong flow velocities.

In order to enhance trouble-free operation and reduce the need for maintenance of the oil separating device, according to the invention, over extended time intervals, a motor control switch with a built in dry-run protection for switching the immersion recirculation pump has been provided in one of the preferred embodiments. This obviates the need for an operator having to monitor the system in the event of low feed flow conditions.

In the simplest version, a magnetic float switch which projects into the tank is provided to protect the immersion recirculation pump from running dry; it is a simple mechanical device and as such maintenance and trouble-free and very reliable.

An additional monitoring requirement is eliminated in a preferred embodiment by providing an inlet valve in the inlet line of the liquid mixture to be separated, Which is controlled by a device for the measuring of the liquid level in the tank.

In a further development of this embodiment the measuring device may consist of a floating device which projects into the tank. Preferably, this floating device is a magnetic float switch which controls the immersion recirculation pump as well as the inlet valve so that only a probe and a switch are necessary as a high level alarm and dry-run protection, which makes the device according to the invention even more compact and lower in cost.

One of the especially preferred embodiments is provided with a backpulsing device with which a compressed air thrust can be generated in the permeate discharge towards the ceramic tubular membranes opposite to the direction of permeate flow. By generating a regular compressed air thrust opposite to the direction of flow of the permeate discharge, it is possible to clean the ceramic filter of oil and small particulate matter again and again, which may have deposited onto it without requiring a filter replacement or causing a significant interruption in the operation of the oil separator. Contrary to the traditionally employed polymeric membranes which would be damaged by such compressed air thrusts, it is possible to achieve a loosening of the oil film which adheres to the membrane surfaces by the exertion of regular compressed air pulses opposite to the direction of the filtrate flow made possible because of the mechanical stability of the ceramic tubular membranes used in the device according to the invention. A fully automatic backflushing is thus achieved, wherein the filtration capacity of the equipment remains stable over extended time periods. Practical experience has shown that only a short rinsing procedure of about one hour is needed every 500 to 1000 operating hours for the device according to the invention. The operating costs for the oil separator according to the invention are therefore limited to the energy costs of operating the pump and the carrying out of an occasional cleaning and rinsing cycle. There are no costs for the replacement of filters, floating ring seals or flocculants, nor are there any additional Costs for the disposal of oil contaminated filter elements.

The backpulsing mechanism is preferably connected to the permeate discharge via a 3/2-way valve. By providing an "intelligent" valve switch with a programmable timer for controlling the 3/2-way valve, it is possible to automate the backpulsing and cleaning function.

In a preferred embodiment, a liquid reservoir is provided in the permeate discharge between the 3/2-way valve and the crossflow filtration device, which may be provided by simply increasing the diameter of a section of the permeate discharge line. A thrust of compressed air acting in the opposite direction to the permeate flow does therefore not cause the column of air in the permeate line to proceed up to the ceramic tubular membranes, but instead the pressure of the compressed air thrust is transmitted to the liquid which is inside of the liquid reservoir. The pressurization of the ceramic tubular membranes is therefore hydraulically actuated. In this manner, the air is prevented from entering into the ceramic body during the backpulse thrust.

In a further embodiment, the same purpose is served by latching the electrical control of the valve switch with the drive mechanism of the immersion recirculation pump in such a way that the 3/2-way valve can only be opened to accept the compressed air thrust if the immersion recirculation pump is running at the same time. This likewise prevents the unintentional entry of air into the ceramic tubular membranes when the recirculation pump is not running which would result in breakdown of the filter since the membrane surfaces would become passivated by the entrained air bubbles.

In a further preferred embodiment, a check valve is fitted into the line on the side of the compressed air supply to prevent liquid from entering the compressed air supply system.

In a further preferred embodiment, a flow meter is provided in the permeate discharge behind the 3/2-way valve when viewed in the direction of permeate flow. In order to prevent air bubbles from interfering with the flow indication, a pipeline is provided between the 3/2-way valve and the flow meter which has a section running towards the bottom with respect to the 3/2-way valve and whose diameter is larger than the pipe diameter of the other sections of the permeate discharge, and which has, after the section running to the bottom, a section running towards the top which houses the flow meter.

During the backpulsing cycle, the permeate line and the permeate section of the microfiltration stage is pressurized, wherein the pipeline is partially filled with compressed air. When the 3/2-way valve is switched over to the permeate discharge mode, this results in a sudden decompression, which can generate pulsations or vibrations of the pipelines, unless special precautions are taken. This is why in another preferred embodiment a vent pipe is fitted immediately behind the 3/2-way valve, when viewed from the permeate discharge in the direction of permeate flow, which serves the purpose of releasing the air which has been introduced by the backpulse thrust, wherein the vent pipe has a section running towards the top with respect to the 3/2-way valve. This special configuration of the vent pipe significantly reduces the shock effect to the pipeline, i.e.; the pipe acts like a vent pipe.

In an advantageous further development, the section of the vent pipe running towards the top has a decompression chamber which serves to decompress the discharged air and to separate the air which has entered the permeate line from the entrained liquid. In order to dispose of the remaining liquid carried by the air in the vent pipe, the vent pipe can be guided into the top of the tank.

An especially effective separation of air and liquid is achieved by positioning all of the sections of the permeate discharge lower than the branching-off point of the vent-pipe from the permeate discharge, specifically by arranging the highest point of the vent pipe at least 0.2 m, preferably 0.3 m, above the highest point of the permeate discharge.

The scope of the invention does not deviate from the process of operating an oil separating device with the above-mentioned features, whereby during the operation of the microfiltration stage, especially while the immersion recirculation pump is running, the cleaning of the inner surfaces of the ceramic tubular membranes is effected by periodic pulsing of the compressed air through the permeate discharge into the crossflow filtration device. The output capacity of the oil separating device according to the invention is not significantly reduced by the short periodic compressed air pulses; this, however, avoids a complete shutdown of the device for the purpose of the periodically required cleaning of the microfiltration system.

Experiments have shown that the oil separating device according to the invention is most effectively operated by exerting compressed air pulses having a pressure of 2 to 10 bar, preferably 4 to 6 bar. In addition, it has been shown that time intervals of between one half and 1 ½ minutes between the individual compressed air pulses and pulse durations of 0.1 to 2 seconds have proven especially beneficial.

The invention is now explained and described in more detail with reference to the embodiments shown in the drawing. The features described and shown in the specification and drawings may be used individually or in any combination with one another in other embodiments of the invention.

DETAILED DESCRIPTION

Contrary to the traditional devices which are manufactured from plastic according to the prior art, the oil separating device 1 according to the invention is manufactured from stainless steel and is therefore corrosion- and temperature-resistant. The system is used to separate oils, fats and solids from emulsions. It is exceptionally ,compact, and it can therefore be used variably as a modular oil separating device for the purpose of meeting the demands for extending the service life of cleaning and degreasing solutions as required by environmental legislation, not only in large industrial assembly lines but also in facilities which require treatment of smaller liquid volumes.

Figure 1:
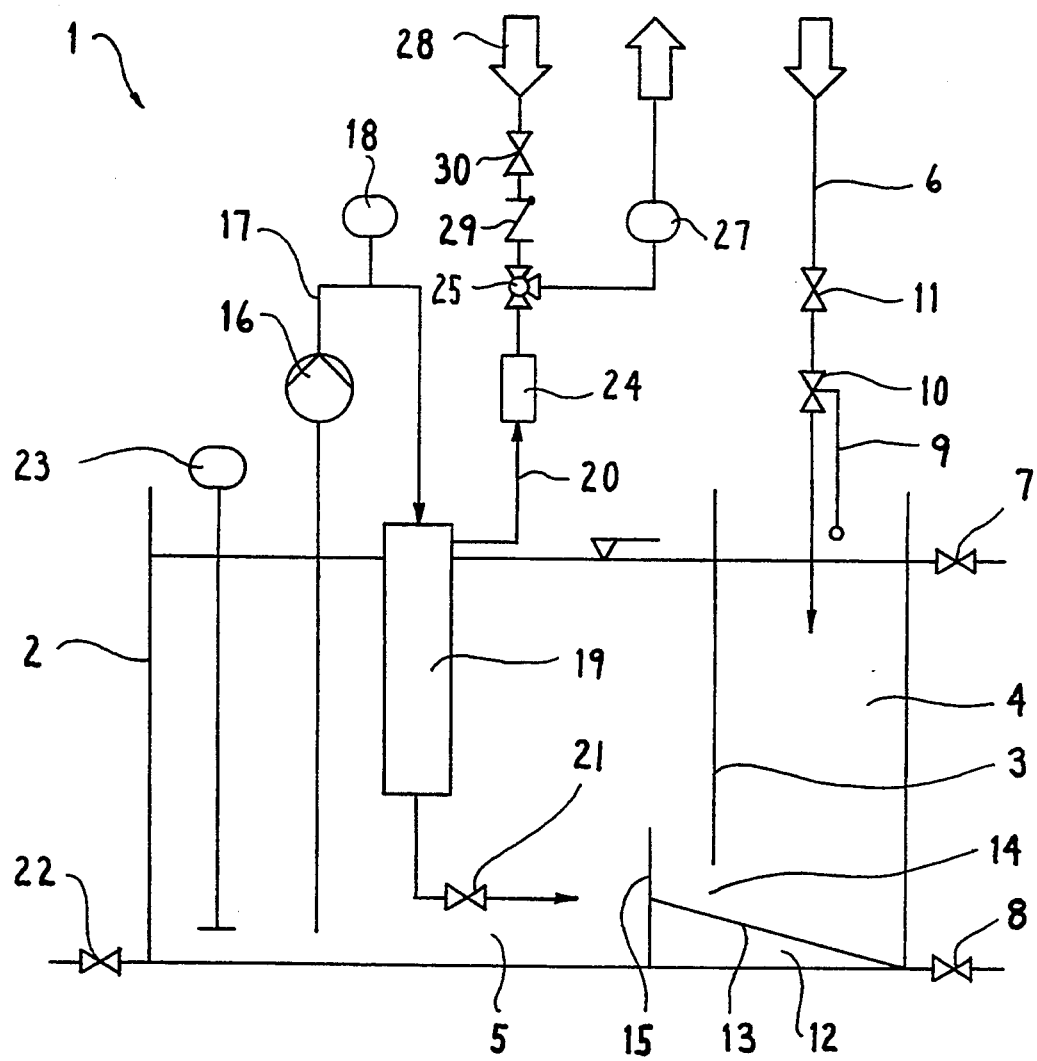
FIG. 1 shows: A schematic functional diagram of the oil separating device according to the invention.

As shown in FIG. 1, the oil separating device 1 shows a tank 2 of stainless steel which is divided by a baffle plate 3 into a pre-separation chamber 4 and another separate compartment 5. An inlet pipe 6 for the oil-containing liquid mixture that is to be separated terminates in the pre-separation chamber 4, in which the liquid is not subjected to any turbulence, so that the lighter oils and fats can float to the top due to their specific gravity while heavier particulates, e.g.; metallic swarf, can settle to the bottom of the pre-separation chamber 4. The top layer of oil and fat, respectively, can be removed from the pre-separation chamber 4 by a first outlet valve 7, while the heavier settled particles can be discharged together with the liquid inside the tank through a second outlet valve 8 located near the bottom of the pre-separation chamber 4, if necessary. A float valve 9 prevents overfilling of the tank 2 by closing the inlet valve 10 fitted in the feed line 6 thereby preventing additional liquid from running into the tank 2. In addition there is a first shut-off valve 11 with which the feed line 6 can be closed also manually.

A baffle 12 [chicane] is provided at the bottom of the pre-separation chamber 4, which, in the shown embodiment, is formed by a ramp 13 which rises steadily from the bottom of the pre-separation chamber 4 through the open gap 14 below the baffle plate 3 towards the separate compartment 5, and a wall 15 which rises from the tank bottom towards the top and extends upwards beyond the level of the lower edge of the baffle plate 3. This keeps the settle heavier solids in the pre-separation chamber 4 from entering the separate compartment 5, otherwise it would be possible in particular for metal swarf and shavings to damage parts of the microfiltration stage which is located in the separate compartment 5.

The liquid mixture passing through the gap 14 from the pre-separation chamber 4 into the separate compartment 5 now only contains emulsified oils and fats. A seal-less immersion and recirculation pump 16 pumps the liquid mixture from the separate compartment 5 forcing it through a pressure line 17, to which a pressure gauge 18 is fitted, into a crossflow filtration device 19 which houses the tubular ceramic membranes, not shown in the drawing, and which projects into the tank 2. The purified permeate is discharged from the oil separating device 1 via the permeate discharge 20 after having passed through the filter membranes, where, due to the corresponding membrane pore sizes, the emulsified oil and fat droplets have been removed.

The retentate, enriched with oil and fat, respectively, and unable to pass through the pores of the tubular ceramic membranes of the crossflow filtration device 19, is returned into the separate compartment 5 through a pipe which is provided with a second shut-off valve 21, which is always open during normal operation.

The continued recirculation through the microfiltration stage results in a build up of fat and oil ,within the liquid mixture inside the separate compartment 5. As soon as the liquid mixture has reached a fat and respectively oil content of between 40 and 60%, the liquid mixture is drained from the tank 2 through a third outlet valve 22 and can, for instance, be further concentrated by vacuum evaporation of the remaining water before disposal.

A magnetic float switch 23 is provided to protect the immersion recirculation pump 16 from running dry by switching off the immersion recirculation pump 16 when the liquid in the separate compartment 5 drops below a certain minimum mark.

Figure 2:
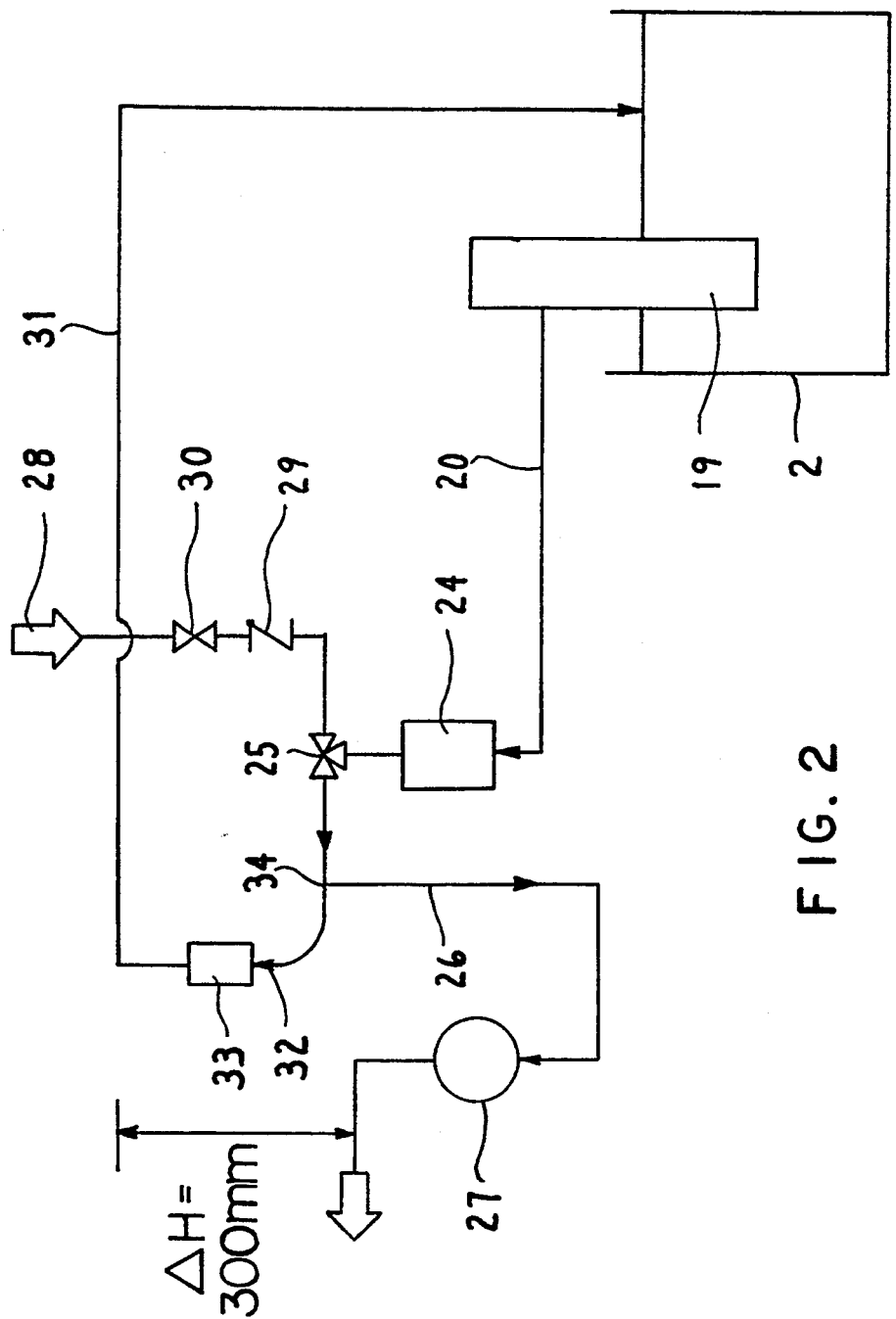
FIG. 2 shows: A schematic functional diagram of the backpulsing device in cooperation with the permeate discharge and the vent pipe.

As shown more detailed in FIG. 2, the permeate from the crossflow filtration device 19 is directed into a liquid storage reservoir 24 which has a significantly larger diameter compared with the permeate discharge line, the significance of which is explained later on. The permeate gets a the down-sloping section 26 of the permeate discharge 20 through a 3/2-way valve, which has a pipe diameter that is significantly larger than that of the other pipe sections of the permeate discharge 20. Thereafter, the permeate runs through a flow measuring device 27, which is located in a rising pipe section of the permeate discharge line 20, and is then finally returned into the original cleaning or degreasing bath which provided the liquid mixture via the inlet 6.

On the other side of the 3/2-way valve 25 a compressed air feed line 28 is provided which can generate a compressed air thrust through the liquid reservoir 24 into the crossflow filtration device 19 in a direction opposite to the direction of the permeate discharge flow if the 3/2-way valve 25 is opened in the corresponding direction. This compressed air thrust dislodges ["knock off"] the oil and fat, respectively, which has been deposited onto the retentate side of the tubular ceramic membrane walls thereby cleaning and reactivating the filter. In order to prevent the entry of air into the membrane surfaces, where fine air bubbles could result in blockage of the filter, the compressed air thrust is absorbed by the liquid inside the liquid reservoir 24 from where it is then hydraulically transmitted to the ceramic tubular membranes. A check valve 29 protects the compressed air supply against an unintentional entry of liquid. It is also possible to manually disconnect the compressed air supply 28 from the permeate discharge 20 by way of a third shut-off valve 30.

A vent pipe 31 positioned behind the 3/2-way valve 25, when viewed in the direction of the permeate discharge flow, branches off the permeate discharge line 20 so that the air introduced by the compressed air thrust into the permeate discharge line 20 can be discharged. This vent pipe 31 has a section 32, which rises with respect to the 3/2-way valve 25, and comprises a decompression chamber 33. Inside of the decompression chamber 33 the air, released from the permeate discharge 20, is decompressed and is largely separated from the liquid particles with which it is mixed. While the permeate which was separated from the air inside the decompression chamber 33 is returned via section 32 into section 26 of the permeate discharge 20, the air, carrying minor liquid residues is carried via the vent pipe 31 into the tank 2 ensuring that any of the remaining liquid is returned into the cycle.

The decompression chamber 33, as well as the enlarged pipe diameter of section 26, serve to substantially reduce the pulsations and vibrations in the pipework which are caused by the decompression of the compressed air pulse. In addition, the kinetic energy of the gas/liquid mixture which is released under pressure is decisively decreased. The increased pipe diameter of the section 26 assists in stabilizing the indication of the flow meter 27 by preventing the air bubbles from interfering with the reading.

It is expedient to locate all of the permeate discharge 20 sections lower than the branching off 34 of the vent pipe 31 from the permeate discharge 20. Special care should be taken to ensure that the highest point of the vent pipe 31 should be positioned at least 0.2 to 0.3 m above the highest point of the permeate discharge line 20 to ensure proper functioning of the vent pipe 31 and the permeate discharge 20.

The automatic cleaning of the cross-flow filtration device 19 by compressed air pulses is provided by an "intelligent" valve switch with a built-in adjustable timer which controls the 3/2-way valve 25. The compressed air thrust pulses are actuated in periodic intervals while the microfiltration stage is in operation and specifically while the immersion recirculation pump 16 is running. This pressurization is effected every 30 to 90 seconds with a pulse duration of between 0.1 to 2 seconds at a pressure setting of 2 to 10 bar, preferably 4 to 6 bar. The cycle time intervals can be best empirically determined during the operation of the oil separating device according to the invention, so that an optimum permeate output can be achieved.

We claim:

1. Oil separating device used to separate oil and fat, respectively, from a liquid mixture, wherein the oil separating device is manufactured from stainless steel and comprises a tank divided by a baffle plate which projects from the top of said tank towards the bottom of said tank to define a pre-separation compartment in which an inlet for the liquid mixture terminates and a separate second compartment, said baffle plate leaving an opening between the separate second compartment and the pre-separation compartment where floating oil and fat, respectively, and sinking solids contained in the liquid mixture are separated from the liquid mixture, a baffle disposed at the tank bottom at a position relative to the baffle plate adapted to prevent the migration of settled solids into the separate compartment, and an immersion type recirculation pump for sucking the liquid out of the separate compartment and forcing it through a cross-flow filtration device which contains tubular ceramic membranes having a pore size of 0.1–2 $\mu$m and which projects into the tank, and from which on one side purified permeate is fed into permeate discharge, and from which on another side, a retentate which has not passed through the pores of said membranes and which is saturated with oil and fat, respectively, is returned to the separate compartment.

2. Oil separating device according to claim 1, characterized in that the baffle has a ramp which rises steadily from the bottom of the pre-separation compartment through the opening left by the baffle plate towards the separate compartment.

3. Oil separating device according to claim 1, characterized in that the baffle comprises a wall which extends from the tank bottom upwards at least to the level of a lower edge of the baffle plate.

4. Oil separating device according to claim 1, characterized by a motor switching device with a built-in dry run protection device for switching the immersion type recirculation pump.

5. Oil separating device according to claim 4, characterized by a magnetic float switch which projects into the tank and serves as a dry run protection device for the immersion type recirculation pump.

6. Oil separating device according to claim 1, characterized by an inlet valve in the inlet of said pre-separation compartment for the liquid mixture to be separated and which is controlled by a measuring device located to measure the liquid level in the tank.

7. Oil separating device according to claim 6, characterized in that the measuring device is a float valve which projects into the tank and by which the inlet valve can be directly mechanically actuated.

8. Oil separating device according to claim 6, characterized by a magnetic float switch as a dry-run protection device which projects into the tank and which is able to control both the immersion recirculation pump and the inlet valve.

9. Oil separating device according to claim 1, characterized by the provision of a backpulsing device which can generate a compressed air thrust in the permeate discharge opposite to the direction of flow of the discharge permeate towards the tubular ceramic membranes, and wherein the backpulsing device is connected through a 3/2-way valve to the permeate discharge by a liquid storage chamber which is located in the permeate discharge between the crossflow filtration device and the 3/2-way valve, and a vent pipe which is disposed immediately adjacent the 3/2-way valve and which serves to expel any air in the permeate discharge produced by a compressed air thrust, said vent pipe having a rising section with respect to the 3/2-way valve.

10. Oil separating device according to claim 9, characterized by a valve switch with a programmable timer to control the 3/2-way valve.

11. Oil separating device according to claim 9, characterized in that the valve switch is coupled to a drive mechanism of the immersion type recirculation pump in such a manner that the 3/2-way valve can only be opened for a compressed air thrust if the immersion type recirculation pump is running at the same time.

12. Oil separating device according to claim 9, characterized by a check valve which is fitted on a side of a compressed air supply adjacent the 3/2-way valve.

13. Oil separating device according to claim 9, characterized in that a pipeline is provided in the permeate discharge adjacent the 3/2-way valve, said pipeline having a downsloping section with respect to the 3/2-way valve with a larger pipe diameter than other sections of the permeate discharge, and having a rising section following said downsloping section and including a flow measuring device.

14. Oil separating device according to claim 9, characterized by a decompression chamber, located in the rising section of the vent pipe to decompress the discharged air.

15. Oil separating device according to claim 9, characterized in that the vent pipe runs into the tank from above.

16. Oil separating device according to claim 9, characterized in that all sections of the permeate discharge are positioned lower than a branching point of the vent pipe from the permeate discharge such that a highest point of the vent pipe is located at least 0.2 meters above a highest point of the permeate discharge.

17. A method for operating an oil separating device according to claim 9, characterized by periodic pulsing of said permeate discharge with compressed air which is introduced into the permeate discharge during operation of the filtration device to clean inner surfaces of the tubular ceramic membranes.

18. A method according to claim 17, characterized in that compressed air which has a pressure of 2 to 10 bar is applied to said permeate discharge.

19. A method according to claim 17, characterized in that a compressed air pulse is exerted to said permeate discharge every 30–90 seconds with a pulse duration of 0.1 to 2 seconds.

20. Oil separating device used to separate oil and fat, respectively, from a liquid mixture, wherein the oil separating device is manufactured from stainless steel and comprises a tank divided by a baffle plate which projects from the top of said tank towards the bottom of said tank to define a pre-separation compartment in which an inlet for the liquid mixture terminates and a separate second compartment, said baffle plate leaving an opening between the separate second compartment and the pre-separation compartment where floating oil and fat, respectively, and sinking solids contained in the liquid mixture are separated from the liquid mixture, a baffle member disposed at the tank bottom at a position relative to the baffle plate adapted to prevent the migration of settled solids into the separate compartment, and an immersion type recirculation pump for sucking the liquid out of the separate compartment and forcing it through a cross-flow filtration device which contains tubular ceramic membranes having a pore size of 0.1–2 $\mu$m and which projects into the tank, and from which on one side purified permeate is fed into a permeate discharge, and from which another side, a retentate which has not passed through the pores of the said membranes and which is saturated with oil and fat, respectively, is returned to the separate compartment, the baffle member having a ramp which rises steadily from the tank bottom in the pre-separation chamber through the opening left by the baffle plate towards the separate compartment, the baffle member comprising a wall which extends from the tank bottom upwards and at least to the level of a lower edge of the baffle plate, a motor switching device with a built-in dry run protection device for switching the immersion recirculation pump, a magnetic float switch which projects into the tank and serves as a dry run protection for the immersion recirculation pump, an inlet valve disposed in the inlet for the liquid mixture to be separated and which is controlled by a measuring device located to measure the liquid level in the tank, the measuring device comprising a float valve which projects into the tank and by which the inlet valve can be directly mechanically actuated, a magnetic float switch as dry-run protection which projects into the tank and which is able to control both the immersion recirculation pump and the inlet valve, a backpulsing device which can generate a compressed air thrust in the permeate discharge opposite to the direction of flow of the discharge permeate towards the tubular ceramic membranes, the backpulsing device being connected through a 3/2-way valve to the permeate discharge and including a liquid storage chamber located in the permeate discharge between the cross-flow filtration device and the 3/2-way valve, a vent pipe which is disposed immediately adjacent the 3/2-way valve, and which serves to expel any air in the permeate discharge produced by a compressed air thrust, the vent pipe including a rising section with respect to the 3/2-way valve, a valve switch with a programmable timer to control the 3/2-way valve, the valve switch being coupled to a drive mechanism of the immersion recirculation pump in such a manner, that the 3/2-way valve can only be opened for a compressed air thrust if the immersion recirculation pump is running at the same time, a check valve which is disposed on the side of a compressed air supply adjacent the 3/2-way valve, and a pipeline communicated to the permeate discharge adjacent the 3/2-way valve, the pipeline having a downsloping section with respect to the 3/2-way valve with a larger pipe diameter than other sections of the permeate discharge and a rising section following said downsloping section and including a flow measuring device, a decompression chamber located in the rising section of the vent pipe for decompressing the discharged air, the vent pipe communicating into the tank from above, wherein a branching point of the vent pipe from the permeate discharge is positioned higher than all sections of the permeate discharge such that a highest point of the vent pipe is located at least 0.2 m above a highest point of the permeate discharge.

* * * * *

UNITED STATES PATENT AND TRADEMARK OFFICE
CERTIFICATE OF CORRECTION

PATENT NO. : 5,372,722
DATED : December 13, 1994
INVENTOR(S) : Hans-Ulrich SCHWERING, et al It is certified that error appears in the above-indentified patent and that said Letters Patent is hereby corrected as shown below:

Column 9, line 29; after "into" insert ---a---.
Column 10, line 33; delete ",".

Signed and Sealed this

Eighteenth Day of April, 1995

Attest:

BRUCE LEHMAN

Attesting Officer

Commissioner of Patents and Trademarks